Patented July 4, 1950

2,513,996

UNITED STATES PATENT OFFICE 2,513,996

REACTION OF A PRIMARY AMINE WITH AN IMINE

Vernon E. Haury, Simi, Calif., assignor to Shell Development Company, San Francisco, Calif., a corporation of Delaware No Drawing. Application December 19, 1947, Serial No. 792,846

5 Claims. (Cl. 260—566)

This invention relates to a method whereby a primary amine is reacted with an imine, the amine residue of the imine being replaced by that of the amine.

Imines have heretofore been prepared by a condensation reaction between either an aldehyde or ketone and an amine, the reaction going forward in the presence of a condensation catalyst which usually is of the acid type. Many imines cannot be prepared by this method, however, or at least the yield thereof is poor, due in part to unstability of the imine in the acid solution. One example of an unstable imine of this character is acetonanil (N-phenylacetonimine). When an attempt is made to produce this compound by reacting acetone and aniline in the presence of an acid catalyst, the product obtained is not acetonanil, but is instead 2,2,4-trimethyldihydroquinoline. In other cases, while some of the desired imine is obtained by condensing the amino and carbonyl reactants, the amount of other products formed is so large that the process must be considered impractical of operation.

It has now been discovered that a primary amine will react with an imine in those cases where the amine residue of the imine reactant has a lower boiling point when in amine form than does the amine reactant itself, said reaction resulting in the replacement of the amine residue of the imine by that of said amine reactant. Accordingly, by making the proper selection of reactants, it is possible to prepare imines of any desired composition. Surprisingly, this reaction goes forward in the absence of any catalyst and requires only that the reactants be heated, with the amine reaction product being distilled off substantially as fast as formed. In this manner it is possible to obtain yields of the desired imine reaction product approaching one hundred percent, with yields above ninety percent being the usual rule. This reaction is one which was most unexpected and could not be forseen, for both amines and imines are notably reactive substances which normally give rise to many reaction products on being maintained at elevated temperatures.

The process of this invention may be illustrated by the following general equation:

wherein R and R''' represent organic radicals other than hydrogen, R' and R'' represent organic radicals which may be hydrogen, and the amine residue (R'N=) of the imine reactant is one which, in amine form (or as ammonia when R' is hydrogen), boils at a lower temperature than does the amine reactant (RNH₂) itself.

Referring more in detail to the general formulae given above, the radicals R and R''', which may be the same or different, can take any one of a wide variety of forms; they may, for example be alkyl, alkenyl, aralkyl, aryl, acyl, alicyclic or heterocyclic radicals. Examples of such radicals are methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octodecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, methallyl-phenyl, triallyl-naphthyl, naphthylallyl, 2-phenyl-ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, pyrrolyl, pyridyl, furyl, butyl carbothionyl, octyl carbothionyl, decyl carbothionyl, etc. Further, these radicals may be substituted with other elements or groups, as halogen, hydroxyl, amino, nitro, carbonyl, sulfo, cyano, etc. For example, such substituted radicals may be chlorobutyl, bromo-octyl, nitroethyl, hydroxycyclohexyl, nitrobenzyl, chlorallyl, chlorobenzoyl, tetrahydrofurfuryl, hydroxyethyl, dihydro-isophoryl, sulfoethyl, benzene sulfonyl, cyanoacetyl, etc.

The radicals R' and R'', as stated, may be hydrogen, though they may also be organic radicals other than hydrogen. In the latter case the radicals may take any of the forms suggested above for the radicals R and R'''.

In the prefered practice of this invention, however, the radical R is a hydrocarbon radical having not more than one olefinic double bond, whereas R', R'' and R''' are preferably saturated hydrocarbon radicals or, in the case of R'', a hydrogen atom; in this preferred grouping R' may also be a hydrogen atom when R''' is a carbonyl-substituted, saturated hydrocarbon radical. The expression "saturated hydrocarbon radicals," as used herein and in the claims, is intended to include not only hydrocarbon radicals in which the carbon atoms are all saturated but also hydrocarbon radicals which contain aromatic multiple linkages but are free from olefinic or acetylenic multiple bonds.

It will be realized that the particular amine and imine reactants selected will depend on the imine compound that it is desired to prepare, always bearing in mind the fact that the amine (or ammonia) formed as a product of the reaction should have a lower boiling point than the amine starting compound. The following table will illustrate in a more particular manner the nature of appropriate reactants which may be employed to form the indicated imine and amine products:

Table

| | Amine Reactant | Imine Reactant | Imine Product | Amine Product |
|---|---|---|---|---|
| 1 | methyl amine | acetylacetonimine | N-methylacetylacetonimine | ammonia. |
| 2 | aniline | N-isopropylacetonimine | acetonanil | isopropylamine. |
| 3 | ___do___ | N-ethylacetonimine | ___do___ | ethylamine. |
| 4 | benzylamine | N-ethylacetonimine | N-benzylacetonimine | Do. |
| 5 | n-propylamine | N-methylbenzaldimine | N-propylbenzaldimine | methylamine. |
| 6 | aniline | acetylacetonimine | N-phenylacetylacetonimine | ammonia. |
| 7 | cyclohexylamine | N-ethylacetonimine | N-cyclohexylacetonimine | ethylamine. |
| 8 | naphthylamine | N-isopropylbenzaldimine | N-naphthylbenzaldimine | isopropylamine. |
| 9 | aniline | N-ethylacetaldimine | N-phenylacetaldimine | ethylamine. |
| 10 | isopropylamine | N-ethyl-(2-cyclohexyl) acetaldimine | N-isopropyl-(2-cyclohexyl)-acetaldimine | Do. |
| 11 | naphthylamine | N-phenylacetonimine | N-naphthylacetonimine | aniline. |

The respective amine and imine reactants may be employed with either one or the other in stoichiometric excess, as from 1 to 3 moles of the one compound for each mole of the other. Generally speaking, however, the most advantageous results in respect to yield of imine product are obtained through use of the reactants in the mole for mole proportions which are theoretically required.

The reaction described herein proceeds when the amine and imine reactants are mixed, and heated to an elevated temperature. This temperature will vary somewhat depending on the nature of the reactants, and should be at least high enough to volatilize the amine product. In general, a satisfactory reaction temperature range is from 75 to 250° C., with somewhat lower or even higher temperatures being successfully employed in the case of particular reactants. Wherever possible the reaction mixture is simply refluxed until the reaction is deemed complete.

The reaction may usually be carried out at atmospheric pressure, though if desirable or necessary, as in the case where low-boiling reactants tending to vaporize at a reaction temperature are used, slightly elevated pressures, as those up to ten atmospheres, may be employed to keep the reactants in the desired liquid phase. In some instances it is desirable to conduct the reaction under subatmospheric pressure conditions. One such instance is that wherein the amine product formed boils at a higher temperature than that at which it is desired to conduct the reaction. Inasmuch as the amine product should be removed substantially as fast as formed, and since distillation provides the easiest manner for effecting said removal, the establishment of a subatmospheric pressure in the reaction chamber permits removal of the amine product as a gas at a lower temperature than would otherwise be possible.

The time required for the reaction to go to completion will vary from ½ to 6 or more hours under favorable reaction conditions. The reaction is deemed complete when the removal of amine product recovered as a distillate is substantially complete.

The process of this invention may be carried on in either the presence or absence of a solvent. In general, however, no solvent is employed since both the amine and imine reactants are normally liquid at reaction temperature. If a solvent is used, as to place the mixture in a more fluid condition, the material selected should be one which is both liquid and inert under the prevailing reaction conditions. Solvents which may be used for this purpose are for example, iso-octane, xylene, dioxane, and diethyleneglycol diethyl ether.

The process of the invention may be carried on in a batchwise, continuous, or intermittent manner. For batch treatment, the amine and imine reactants are simply introduced into a suitable reaction vessel, and the resulting mixture is then heated at the desired temperature until the reaction is complete. In many cases the mixture is simply refluxed, with the amine formed as a product of the reaction being allowed to escape as a gas from the retort. In the case of continuous operation, added quantities of the reactants may be supplied as the reaction progresses, the amine product being constantly withdrawn.

After the reaction is complete, the imine product is separated from the other components of the mixture of which it forms a part in any convenient manner. The preferred separation method is that of fractional distillation, at reduced pressure if necessary. The imines are normally stable materials which can be volatilized without change in comoposition. However, other methods of separation may be used if desired.

The following examples illustrate the manner in which the present invention finds preferred embodiment:

*Example I*

A mixture of 3 moles of aniline and 3.3 moles of N-isopropylacetonimine was heated for a period of of 6 hours at a temperature between 90 and 155° C., the isopropylamine formed during the reaction being distilled off as formed. The reaction product was then separated into its components by distillation at reduced pressure. In this manner there was obtained 0.6 mole of aniline, 2.3 moles of acetonanil, and 12 grams of bottoms. The acetonanil fraction was that which boiled at 129–130° C., at 100 mm. of mercury. It displayed a specific gravity 20/4 of 0.9535 and a refractive index 20/D of 1.54. The yield of acetonanil was 77%.

*Example II*

This operation was conducted by reacting 3.36 moles of aniline with 3 moles of N-1,3-dimethylbutylacetonimine for 6 hours at 150 to 180° C., distilling 1,3-dimethylbutylamine as formed. On distilling the residue it was found that 95% of the aniline had reacted, and that the yield of acetonanil was 97%.

*Example III*

In this operation acetylacetonimine (distilling at 129 to 130° C. at 50 mm. Hg, and obtained by adding anhydrous ammonia to acetylacetone containing a small amount of acid catalyst) was mixed with 1,3-dimethylbutylamine, and the resulting mixture was heated until no further ammonia was evolved. The product was determined to be N-1,3-dimethylbutylacetylacetonimine distilling at 113 to 115° C. at 10 mm. Hg. This operation is representative of the replacement of the amine residue =NH in the imine reactant by a higher amine.

*Example IV*

N-allylacetonimine was prepared in 95% yield by reacting allylamine with N-isopropylacetonimine, with the simultaneous distillation of the amine product isopropylamine. The N-allylacetonimine obtained in this manner was found to have a boiling point of 113 to 114° C., a specific gravity 20/4 of 0.794, and a refractive index 20/D of 1.436. It was relatively unstable.

*Example V*

In this reaction 0.78 mole each of N-isopropylisobutyraldimine and 1,3-dimethylbutylamine was refluxed together until all of the isopropylamine formed had been distilled off. There was then recovered by distillation 0.72 mole of N-1,3-dimethylbutylisobutyraldimine, a material which had a boiling point of 94 to 95° C. at 100 mm. Hg, and of 159 to 160° C. at 760 mm. Hg.

*Example VI*

This operation was conducted by reacting N - (1,3-dimethylbutyl) - methylisobutylketimine with dihydroisophorylamine at 150 to 175° C., the 1,3-dimethylbutylamine product being distilled off as formed, and N-(dihydroisophoryl)-methylisobutylketimine being identified as a component of the residue.

I claim as my invention:

1. The method of forming acetonanil comprising reacting aniline with N-isopropylacetonimine while simultaneously eliminating from the reaction mixture the isopropylamine formed, said reaction being conducted at a temperaure above the boiling point of said isopropylamine.

2. The method of forming acetonanil comprising reacting aniline with N-1,3-dimethylbutylacetonimine while simultaneously eliminating from the reaction mixture the 1,3-dimethylbutylamine formed, said reaction being conducted at a temperature above the boiling point of said 1,3-dimethylbutylimine.

3. A process of producing an imine which comprises reacting a primary amine of the formula RNH$_2$ wherein R is a hydrocarbon radical having not more than one olefinic double bond, with an imine of the formula

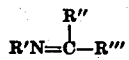

wherein R' is a saturated hydrocarbon radical such that the compound R'NH$_2$ has a lower boiling point than said primary amine RNH$_2$, R'' is a member of the group consisting of hydrogen and the saturated hydrocarbon radicals, and R'''

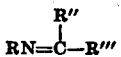

is a saturated hydrocarbon radical, said reaction being effected at a temperature at which said amine R'NH$_2$ boils under the existing pressure, whereby an imine of the formula

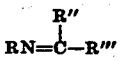

and said amine R'NH$_2$ are formed in the reaction, and the amine R'NH$_2$ is distilled from the reaction mixture.

4. The method of forming acetonanil which comprises reacting aniline with an N-alkylacetonimine wherein said alkyl group corresponds to the alkyl group of a primary alkyl amine which is lower boiling than aniline, said reaction being conducted at a temperature at least equal to the boiling temperature of said primary alkyl amine under the reaction conditions, whereby there are formed acetonanil and the aforesaid primary alkyl amine, with the latter compound being distilled from the reaction mixture as the reaction progresses.

5. The method of forming N-allylacetonimine comprising reacting allylamine with N-isopropylacetonimine while simultaneously eliminating from the reaction mixture the isopropylamine formed, said reaction being conducted at a temperature above the boiling point of said isopropylamine.

VERNON E. HAURY.

No references cited.

Certificate of Correction

Patent No. 2,513,996 — July 4, 1950

VERNON E. HAURY

It is hereby certified that error appears in the printed specification of the above numbered patent requiring correction as follows:

Column 6, lines 17, 18, and 19, strike out the formula

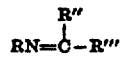

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*